United States Patent [19]

Nordell

[11] 4,366,879
[45] Jan. 4, 1983

[54] TRUCK CAB LIFTER

[76] Inventor: Randy J. Nordell, 176 N. Redwood Rd., Apt. #76, Salt Lake City, Utah 84116

[21] Appl. No.: 220,788

[22] Filed: Dec. 29, 1980

[51] Int. Cl.³ .......................................... B62D 33/06
[52] U.S. Cl. ................................. 180/89.15; 91/442
[58] Field of Search ............... 180/89.14, 89.15, 89.16; 296/190; 91/442, 268, 468

[56] References Cited

U.S. PATENT DOCUMENTS

| 2,951,548 | 9/1960 | Crockett et al. | 180/89.14 |
| 3,642,316 | 2/1972 | Porth et al. | 296/190 |

Primary Examiner—Robert R. Song
Attorney, Agent, or Firm—M. Reid Russell

[57] ABSTRACT

A truck cab lifting system that utilizes a single action hydraulic actuator, mechanical screw, or the like, connected between a truck frame and cab to tilt or pivot appropriately the cab of a cab-over truck, to expose the truck engine compartment, and return. The invention includes locating the single action hydraulic actuator, mechanical screw, or the like, forward of the truck wheel to extend a push rod, screw end, or the like, from the end thereof that pivotally connects to the cab to tilt or pivot that cab around its hinge connection to the truck frame, to move across that hinge connection and to provide a speed restraint as the cab travels through approximately forty-five degrees (45°) to where it is fully rotated, and for cab return to an engine covering attitude.

10 Claims, 6 Drawing Figures

TRUCK CAB LIFTER

FIELD OF THE INVENTION

This invention relates primarily to truck cab pivoting or tilting mechanisms for use with trucks commonly known as cab-overs.

The stringent government controls imposed upon vehicles hauling freight over the nation's highways relating to unit length has provided the incentive to develop cab-over trucks that are constructed to have a minimum length so as to maximize the unit length legally available for freight carrying purposes. Such trucks generally include a tiltable body or cab covering over the engine compartment; with that body or cab arranged to tilt or pivot therefrom to allow engine compartment access.

The present invention involves a simplified lifting device arranged between the truck frame and cab to provide cab lifting that includes few and less complicated components than former devices and is simple to install and operate. The present invention includes a single action hydraulic actuator or screw that extends a push rod portion thereof connected to both lift and resist lowering of a truck cab. The present invention performs functions that heretofore have involved double action lifting arrangements, and, where prior devices have involved single action devices, such have been arranged differently to the arrangement of the present invention and have been limited in their performance capabilities. Some examples of cab lifting arrangements that are unlike the present invention are shown in U.S. Pat. Nos. 3,948,341 and 3,853,368. Cab tilting systems that utilize single action hydraulic actuators or jacks that are pivotally connected to a truck frame are shown in U.S. Pat. Nos. 3,787,087 and 3,958,659. None of these arrangements, however, provides for moving of a truck cab through a full ninety degrees (90°) of arc of travel, and return, as does the present invention.

Certain devices, like those shown in U.S. Pat. Nos. 3,642,316 and 3,972,557, have provided for lifting of a truck cab, to pivot it off from and to return it to its engine compartment covering attitude. Unlike the present invention, however, such devices have involved double action lifting systems that are positioned between the truck cab and frame differently from that of the present invention.

Within the knowledge of the inventor, there has not heretofore existed a truck cab lifting device like that of the present invention and its arrangement that enables a controlled movement, through approximately a ninety-degree (90°) arc of travel, of a truck cab of a tilt cab truck. The present invention is therefore believed to be both novel and unique and a significant improvement in the art.

SUMMARY OF THE INVENTION

It is therefore a general object of the present invention in a truck cab lifter to provide a push rod extending device that is arranged to provide for both lifting and travel control of a cab of a cab-over or tilt cab truck off from an engine compartment covering attitude, through ninety degrees (90°) arc of travel, and to lift and control the return of that cab back to its original truck engine covering attitude.

It is an additional object of the present invention in a truck cab lifter to provide a device to both pivot appropriately a cab of conventional cab-over truck off from over a truck engine compartment and for braking or providing a force opposing lowering of that truck cab as it is moved through forty-five degrees (45°) to a fully tilted attitude and back to an engine compartment covering attitude.

It is an additional object of the present invention to provide a lifting device arranged for both lifting and controlling travel of a truck cab of a cab-over truck through a rotation thereof of ninety degrees (90°).

It is an additional object of the present invention to provide a truck-cab tilting device that is simple and inexpensive to construct, install and maintain, for providing a safe and reliable truck cab lifting system.

In accordance with the above objects, the present invention in a truck cab lifter incorporates, as a truck cab moving component, a single action hydraulic actuator, mechanical screw, or the like the truck cab moving component connects between a truck cab and truck frame to extend a push rod therefrom to lift the cab through forty-five degrees (45°) arc of travel when the cab moving component travels across a hinge connection of the truck cab to the truck frame and thereafter provides a resistant to travel as the cab is lowered after passing forty-five degrees (45°). The present invention involves pivotally connecting an end of that conventional single action hydraulic actuator, mechanical screw, or the like, to the truck frame, forward of a front axle thereof, and pivotally connecting an end of the push rod, that extends therefrom, to the truck cab. Appropriate hydraulic lines with valving and controls are included with such hydraulic actuator that connect to pass and return fluid from a conventional pump and reservoir to operate a piston whose travel moves the push rod. Similarly, a mechanical screw functioning, as described, preferably includes an appropriate motor and screw turning arrangement, or the like to move the push rod, with appropriate switching therewith to connect it to a source of electrical energy.

THE DRAWINGS

Figure 1:
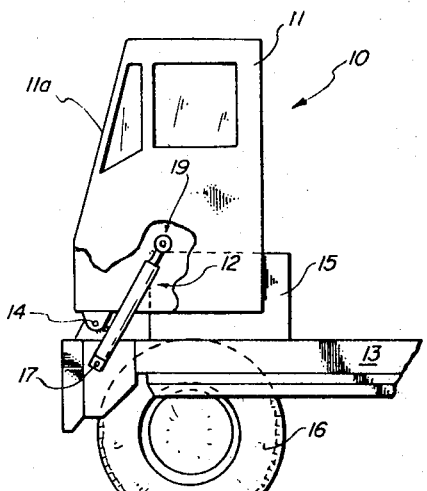
FIG. 1, is a side elevation view of a front portion of a conventional cab-over truck showing a section of the side thereof removed to expose the present invention in a truck cab lifter connected between the truck cab and frame.
Figure 3A:
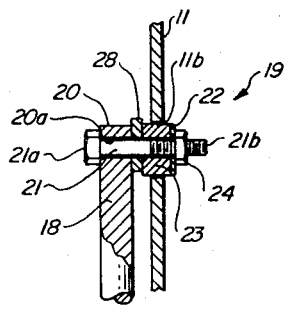
Figure 3:
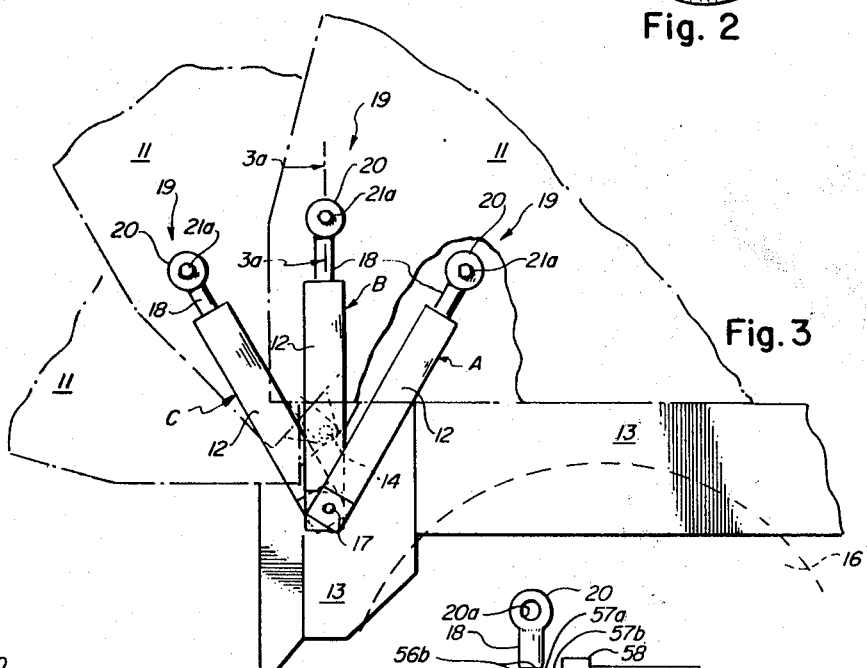
Figure 4:
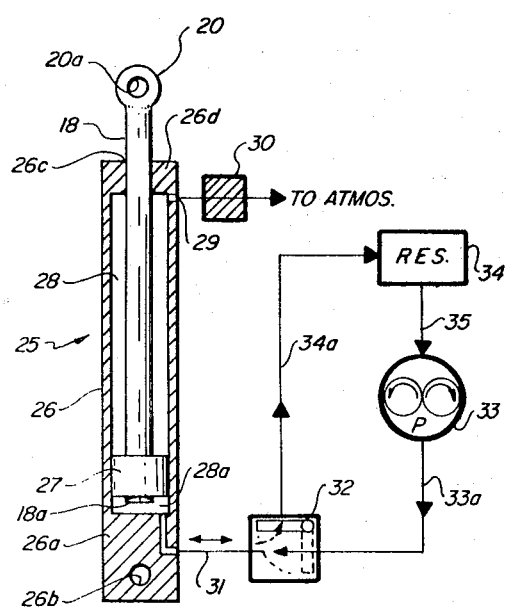
Figure 5:
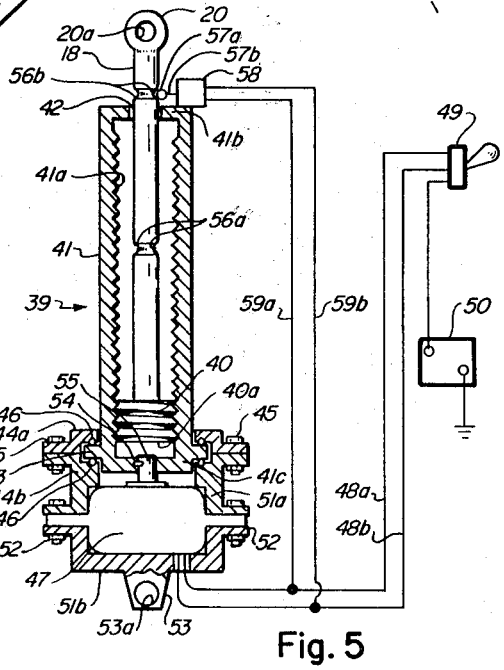

FIG. 3, is an expanded view of a forward portion of the truck cab of FIG. 1, showing the truck cab lifter, that can be either a hydraulic actuator or motor driven mechanical screw, in three attitudes of travel reflecting the cab in an engine covering attitude, rotated to approximately forty-five degrees (45°) arc of travel, and rotated to approximately ninety degrees (90°) arc of travel, which attitudes are identified by arrows A, B and C, respectively;

FIG. 3(a), is a sectional view taken along the lines 3(a)—3(a) of FIG. 3, showing a pivotal connection of the push rod end of the truck cab;

FIG. 4, is a sectional view of a single action hydraulic actuator taken along the line 4—4 of FIG. 3, and additionally showing a schematic of hydraulic lines connected thereto and to a hydraulic pump and reservoir assembly with a meter valve arrangement therewith; and FIG. 5, is a view like that of FIG. 4 only showing a motor driven mechanical screw showing the screw turned in a collar connected to the electric motor with the electric motor shown connected by wires through a limit switch to operate the switch connected to a power source, to illustrate electric motor control for turning the screw in either direction.

REFERRING NOW TO THE DRAWINGS

FIG. 1 shows a side elevation view of a front portion of a conventional cab-over truck 10, hereinafter referred to as truck. Shown therein, a section of the side of a cab 11 thereof has been removed to expose a truck cab lifter 12 of the present invention, hereinafter referred to as lifter, which lifter 12, as will be described in detail later herein, can be hydraulically or mechanically operated. Shown therein, the truck 10 includes a frame 13 whereto the cab 11 is pivotally connected at forward pivot 14. It should be understood that a locking assembly, not shown, is preferably provided with the truck 10 for maintaining the cab to the truck frame during truck movement.

Figure 2:
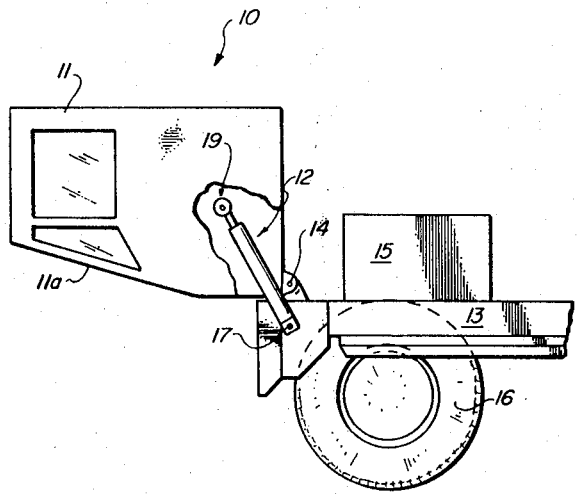
FIG. 2, is a view like that of FIG. 1 only showing the truck cab having been rotated through approximately ninety degrees (90°) off of the truck engine compartment.

Shown in FIG. 2, the cab 11 has been rotated from an engine compartment 15 covering attitude, around forward pivot 14, the lifter 12 passing across the forward pivot through approximately ninety degrees (90°) arc of travel to a fully tilted attitude. The lifter 12, as will be described in detail later herein, is preferably pivotally coupled at 17 to frame 13, forward of an axle of truck front wheel 16. So arranged the cab 11 can pivot through approximately the desired ninety degree (90°) arc of travel. Shown in FIGS. 1 through 3 that pivotal coupling 17 is preferably near a forward end of frame 13 and nearly in alignment with a front end line 11a of cab 11.

With the cab 11 in an engine compartment 15 covering attitude, the lifter 12 with a push rod 18 extended therefrom that is pivotally coupled at 19 to cab 11 will be in the attitude shown in FIG. 1 as shown in FIG. 3, identified by arrow A. So arranged, lifter 12 is energized to extend push rod 18 to elevate cab 11 to the attitude identified by an arrow B in FIG. 3, whereat the cab has traveled through approximately forty-five degrees (45°) arc, and the lifter is approximately over the pivot 14 and the weight of the cab is approximately balanced. The cab 11 as it continues past that balanced state, illustrated by arrow B in FIG. 3, moves the lifter 12 past the pivot 14 the weight of the cab acting against the push rod 18, tending to push that rod back into lifter 12. Lifter 12, therefore, is preferably arranged to provide resistance to such push rod movement, to provide a controlled lowering to a fully tilted attitude, as shown in FIG. 2 and as illustrated by arrow C in FIG. 3, with the cab having pivoted through ninety degrees (90°) arc of travel. Such resistance to travel is provided, in a hydraulic embodiment of lifter 12 by a metering valve and, in a motor driven mechanical screw embodiment by appropriate current switching to the motor thereof to appropriately turn the screw.

In FIG. 3(a) is shown a preferred pivot coupling 19 of push rod 18 end and cab 11 as forming an eyelet end 20 to push rod 18 with a lateral opening 20a formed therethrough to receive a conventional bolt 21 that has a head 21a on one end and is threaded at 21b to receive a nut 24 thereover. The bolt 21 is preferably fitted through the eyelet opening 20a, through washer 23a and a bearing 23, which bearing can be a roller, cup and cone, or like bearing, that is arranged in opening 11b of cab 11, and through a washer 22, and has nut 24 turned thereover. So arranged, extension of push rod 18 will be translated through bolt 21 through bearing 23 to cab 11, the cab moving as shown in FIG. 3. While preferred, it should be understood that bearing 23 could be dispensed with so long as the pivot coupling 19 is sufficiently loose to provide freedom of movement therebetween.

Shown in the sectional view of FIG. 4, is a first preferred embodiment of lifter 12 that includes a hydraulic actuator 25 that includes a cylindrical housing 26, that is close across a base end 26a thereof wherethrough is formed a lateral hole 26b to receive a bolt, or like fastener, not shown, as pivot coupling 17. The push rod 18 is fitted through an opening 26c in the housing end 26d and includes a piston 27 across an end 18a thereof. A cavity 28 is formed within housing 26 wherein push rod 18 moves, with the area thereof below piston 27 defined as a fluid expansion chamber 28a. A fluid introduced in expansion chamber 28a will therefore move piston 27 and push rod 18 connected thereto, extending the push rod from housing 26c, as described. To avoid compressing air within cavity 28 a vent 29 to atmosphere is provided and a filter 30 is preferably provided thereover to prohibit contamination from entering the cavity 28.

Expansion chamber 28a can be connected to receive fluid, under pressure, from the truck hydraulic system, not shown, or, as shown in FIG. 4, can receive fluid, under pressure, from an independent system. In FIG. 4, the expansion chamber 28a is shown connected through a line 31 to a metering valve 32. Meter valve 32 is preferably a two position valve, connecting, in one attitude, line 31 to receive fluid, under pressure, from pump 33 through line 33a, and in the other attitude connects line 31 through a line 34a to a reservoir 34. Reservoir 34, in turn provides fluid to pump 33 through line 35, completing a fluid flow loop. In practice, pump 33 is operated to pass fluid through metering valve 32 to expansion chamber 28a to extend push rod 18 until the cab has moved to a balanced state at approximately the forty-five degrees (45°) arc of travel. Then, as the cab moves from the forty-five degree (45°) attitude to a fully tilted state, at ninety degrees (90°), the weight thereof is directed against push rod 18 pushing against the fluid in expansion chamber 28a. To provide resistance to cab lowering, the metering valve 32 positioning, at the forty-five degree (45°) arc of travel of the cab, is switched to pass fluid back to reservoir 34, which fluid flow is through a small orifice to provide a resistance to cab 11 lowering, providing a controlled descent thereto. Cab 11 movement back to an engine covering attitude is, of course, the same as the above, the metering valve 32 positioned to pass fluid to raise the cab from a ninety degree (90°) tilted attitude, as shown in FIG. 2, to forty-five degrees (45°) whereat the valve positioning changes to cushion cab travel back to the engine covering attitude, as shown in FIG. 1.

Hydraulic actuator 25 is a single action device, and is capable of extending the push rod 18 outwardly only. Therefore, location of coupling 19 to frame 13 and the arrangement of pivot coupling 19 to cab 11 is critical to provide both a lifting and braking of cab 11, as described.

A second preferred lifter 12 is shown in FIG. 5 as including a mechanical screw 39 that consists of an inset screw 40 that is turned into a threaded barrel of sleeve 41. The push rod 18 is secured, as shown in FIG. 5, to inset screw 40 and connects, as described, at its eyelet end 20 to truck cab 11. By turning sleeve 41, therefore, screw 40 will advance over threads 41a therein to extend or retract push rod 18. Shown in FIG. 5 sleeve 41 top end 41b is open at 42 to pass push rod 18 therethrough and is flanged outwardly, at 43 around bottom end 41c thereof. Sleeve flange 43 is sandwiched between upper and lower races 44a and 44b that are connected together by bolt end nut combinations 45. Races 44a and 44b contain hardened balls 46, supporting sleeve flange 43 thereon, sleeve flange 43 rotating freely thereon.

Mechanical screw 39, to provide turning of sleeve 41, includes an electric motor 47 that connects through wires 48a and 48b to an appropriate switch 49 and a power supply 50, which power supply can be the vehicle electrical power system. Motor 47, in turn, is contained within upper and lower motor housing segments 51a and 51b, that are connected at flanged surfaces thereof by bolt and nut combinations 52, which upper motor housing segment 51a includes lower race 44b. A finger 53 is included with the lower motor housing segment, extending at a normal angle from the bottom thereof, that includes a hole 53a formed therethrough to receive a bolt, not shown, or like fastener, for coupling as pivot coupling 17 to truck frame 13.

Shown in FIG. 5, electric motor 47 turns a shaft 54 that is splined by key 55 to sleeve base 41c, which sleeve turning, as described above, moves screw 40 to extend and retract push rod 18. Push rod 18, of course, connects through eyelet end 20 to pivot coupling 19 for tilting and returning cab 11. To provide for limiting extension of push rod 18, as when approximately a forty-five degree (45°) cab attitude is reached, push rod 18 includes a first or fully extended groove 56a for engaging a roller end 57a of a spring loaded switch arm 57b of a switch 58 that is secured appropriately to the truck cab 11. So arranged, roller end 57a will travel along push rod 18 between the extended groove 56a, where that rod is fully extended to a second or fully retracted groove 56b, where the rod is fully retracted, as when cab 11 is in a fully tilted attitude after approximately a ninety degree (90°) arc of travel. Back and forth travel of spring loaded switch arm 57b, responsive to movement of roller end 57a, operates switch 58 to provide a signal flow through lines 59a and 59b, for switching of current flow to the electric motor 47. Thereby, as the push rod 18 is extended the roller end 57a travels from retracted groove 56b to extended groove 56a, whereat the outward movement of the spring loaded switch arm 57b operates switch 58 to change current flow to electric motor 47, thereby reversing the direction of motor turning, reversing the direction of travel of screw 40, to retract push rod 18 until roller end 57a again enters retracted groove 56b, restoring the original current flow path. Switch 49 is operated to turn on and off motor 47, and, of course, could be arranged to operate to turn off at the second current path reversal described above.

Shown best in FIGS. 1 through 3, the pivotal connection 17 of lifter 12 to truck frame 13 is preferably located as far forward as possible thereon and must, at least, be located beyond the axle of wheel 16 for the present invention to operate as described. Although such positioning thereof could be altered from that shown in FIG. 4, as long as that pivot is forward of the axle of wheel 16, the lifter 12 would still function essentially as has been described herein. Further, while preferred arrangements of hydraulic actuator and mechanical screw configurations of lifters have been shown and described herein, it should be understood that the present disclosure is not limited to a particular lifter structure, but should be understood to include any like arrangement that will function, as has been described.

While a preferred embodiment of the present invention in a truck cab lifter has been shown and described herein, it should be understood that the present disclosure is made by way of example only and that variations are possible without departing from the subject matter coming within the scope of the following claims, which claims I regard as my invention.

I claim:

1. A truck cab lifter comprising,
    lifter means pivotally connected between a truck frame forward of a front axle thereof and a truck cab that is, in turn, pivotally connected to said truck frame, said lifter means for extending a push rod therefrom that connects to said truck cab such that extension thereof will pivot said truck cab around its connection to said truck frame with said lifter means arranged to pivot in an arc across said truck cab pivot coupling to said frame, said lifter means lifting the truck cab until a balance point is reached whereafter, with continued cab travel, it supports the weight of said truck cab as it decends;
    means for operating said lifter means to extend and retract said push rod; and means for limiting extension of said push rod corresponding to a balanced state of said truck cab.

2. A truck cab lifter as recited in claim 1, wherein, the pivotal connection of the lifter means to the truck frame is proximate to the forward end of said frame and is approximately vertically aligned with the pivotal connection of the truck cab to said truck frame.

3. A truck cab lifter as recited in claim 1, wherein, the lifter means is a hydraulic actuator.

4. A truck cab lifter as recited in claim 3, wherein the means for operating said lifter means consists of,
    an actuator body, pivotally connected to the truck frame, wherefrom the push rod extends;
    piston means connected to said push rod arranged within said actuator body to travel therein, to extend said push rod, responsive to a flow of fluid under pressure passed therein;
    fluid transfer lines connected to said hydraulic actuator to provide fluid thereto, and to a source of fluid under pressure; and
    means for controlling passage of fluid under pressure to said hydraulic actuator responsive to travel of the truck cab.

5. A truck cab hydraulic lifter as recited in claim 4, further including,
    means for limiting fluid the back flow rate passed from the hydraulic actuator responsive to a retraction of the push rod.

6. A truck cab hydraulic lifter as recited in claim 5, wherein the flow limiting means consists of, a metering valve.

7. A truck cab lifter as recited in claim 1, wherein, the lifter means is a mechanical screw operated by an electric motor.

8. A truck cab lifter as recited in claim 7, wherein the means for operating said lifter means includes,
    an electric motor connected through appropriate switch means to a source of electrical energy, which motor is capable of turning in either direction to extend and retract the push rod;

limit switch means for controlling push rod extension responsive to a point in said truck cab travel where it is at a balanced state, approximately over its coupling to said truck frame, which limit switch means thereat operates to reverse the direction of turning of said electric motor;

an internally threaded sleeve arranged for turning by said electric motor; and inset screw means connected to said push rod and turned onto said threads of said sleeve such that turning said sleeve moves said screw means and connected push rod.

9. A truck cab lifter as recited in claim 8, wherein, the sleeve is journaled to a housing mounting the electric motor and is connected to an output shaft of said electric motor so as to be turned thereby.

10. A truck cab lifter as recited in claim 1, further including, means for controlling the rate of descent of the truck cab as it is pivoted past a balanced state approximately over the pivot coupling to the truck frame.

* * * * *